(12) United States Patent
Zheng et al.

(10) Patent No.: US 8,282,291 B2
(45) Date of Patent: Oct. 9, 2012

(54) AUTOMATIC ALIGNMENT FOR SPLICING OF NON-CIRCULAR FIBER

(75) Inventors: Wenxin Zheng, Moore, SC (US); Toshiki Kubo, Greer, SC (US); Bryan Malinsky, Simpsonville, SC (US); Yoshiharu Kanda, Greer, SC (US); Doug Duke, Simpsonville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 222 days.

(21) Appl. No.: 12/673,864

(22) PCT Filed: Sep. 15, 2009

(86) PCT No.: PCT/US2009/056974
§ 371 (c)(1),
(2), (4) Date: Feb. 17, 2010

(87) PCT Pub. No.: WO2010/033498
PCT Pub. Date: Mar. 25, 2010

(65) Prior Publication Data
US 2011/0064366 A1 Mar. 17, 2011

Related U.S. Application Data

(60) Provisional application No. 61/097,259, filed on Sep. 16, 2008.

(51) Int. Cl.
*G02B 6/255* (2006.01)

(52) U.S. Cl. ................................ 385/97; 385/95; 385/96
(58) Field of Classification Search ....................... None
See application file for complete search history.

(56) References Cited

U.S. PATENT DOCUMENTS

| | | | |
|---|---|---|---|
| 4,784,458 A | 11/1988 | Horowitz et al. | |
| 4,911,524 A | 3/1990 | Itoh et al. | |
| 5,011,259 A * | 4/1991 | Lieber et al. | 385/55 |
| 5,340,371 A | 8/1994 | Dyott | |
| 5,754,721 A | 5/1998 | Pan | |
| 6,148,639 A * | 11/2000 | Zheng et al. | 65/407 |
| 6,203,214 B1 * | 3/2001 | Wesson | 385/97 |
| 2009/0010601 A1 * | 1/2009 | Huang et al. | 385/97 |

* cited by examiner

*Primary Examiner* — Hemang Sanghavi
(74) *Attorney, Agent, or Firm* — Sughrue Mion, PLLC

(57) ABSTRACT

A method of aligning a non-circular fiber with another component is provided. A method of aligning a first D-fiber with a second D-fiber includes rotating the first D-fiber; obtaining a first image profile of an end of the first D-fiber; using the first image profile to measure a diameter of a cladding of the first D-fiber along a first direction; and repeating these operations until a minimum diameter of the cladding of the first D-fiber is aligned along the first direction. The method also includes rotating the second D-fiber; obtaining a second image profile of an end of the second D-fiber; using the second image profile to measure a diameter of a cladding of the second D-fiber along the first direction; and repeating these operations until a minimum diameter of the cladding of the second D-fiber is aligned along the first direction.

13 Claims, 6 Drawing Sheets

AUTOMATIC ALIGNMENT FOR SPLICING OF NON-CIRCULAR FIBER

CROSS-REFERENCE TO RELATED PATENT APPLICATION

This application claims the benefit of U.S. Provisional Application No. 61/097,259, filed on Sep. 16, 2008 in the United States Patent and Trademark Office, the disclosure of which is incorporated by reference in its entirety.

BACKGROUND OF THE INVENTION

1. Field of the Invention

Methods consistent with the present invention relate to aligning a non-circular fiber, and more particularly, to aligning a non-circular fiber to match the polarization direction of a component to which the non-circular fiber will be spliced.

2. Description of the Related Art

Optical fibers are formed in many shapes, and include a core surrounded by a cladding to guide the light. A circular fiber has a cladding with a circular cross-sectional shape. A number of non-circular fibers have also been produced, such as hexagonal, octagonal, and rectangular fibers. These fibers have claddings with cross-sectional shapes that are non-circular and do not have rotational symmetry.

One example of a non-circular fiber is D-fiber, which was developed and investigated about a decade ago, and has been gaining wide application in many different areas, such as optical sensing, microcellular mobile communication systems, fiber polarizers, and fiber couplers. As shown in FIG. 1, the cladding (200) of a D-fiber (100) is shaped like the letter "D". Polarization-maintaining D-fiber may have an elliptical core (300). In recent fiber laser developments, D-fiber has also been used in double cladding fibers as the inner clad to repress the helical mode for higher pump efficiency.

Consistent and time-efficient D-fiber splicing is required for the production lines of components such as fiber gyroscopes and fiber amplifiers. Two primary challenges in low loss fusion splicing of D-fiber are polarization alignment and fiber core alignment. Many methods and approaches have been developed and tested for splicing different polarization fiber types and rare earth doped active fibers. However, only a very limited number of publications discuss D-shape fiber splicing.

For example, the article "Low loss elliptical core D-fiber to PANDA fiber fusion splicing," 1 Sep. 2008/Vol. 16, No. 18/OPTICS EXPRESS 13559 by Joshua M. Kvavle, Stephen M. Schultz, and Richard H. Selfridge describes a method in which D-fiber is spliced to PANDA fiber using an elliptical-core fiber in a bridge splice. First the PANDA fiber is spliced to the elliptical-core fiber, and then the elliptical-core fiber is spliced to the D-fiber. Elliptical-core fiber is chosen as the bridge fiber because its circular cladding matches the circular cladding of the PANDA fiber, and its elliptical core matches the elliptical core of the D-fiber. The core of the elliptical-core fiber is expanded to match the mode of the PANDA fiber, and the D-fiber is connected to the elliptical-core fiber using a low temperature splice. This method requires the polarization alignment to be performed manually, resulting in time-consuming extinction ratio measurements. Although this process can be performed in a laboratory setting, it is too costly in both equipment and labor time to be used in production.

Further, as shown in FIG. 3A, a length of D-fiber (100) may be slightly bowed or curled when suspended from one end. This effect is caused by the mismatch in thermal expansion between the silica body and the doped guiding region. This characteristic of D-fiber presents challenges in cleave quality, splicer rotational alignment, and splice loss.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method of aligning a non-circular fiber with another component.

According to an aspect of the present invention, there is provided a method of aligning a first D-fiber with a second D-fiber, the method including: (a) rotating the first D-fiber; (b) obtaining a first image profile of an end of the first D-fiber and using the first image profile to measure a diameter of a cladding of the first D-fiber along a first direction; and (c) repeating (a) and (b) until a minimum diameter of the cladding of the first D-fiber is aligned along the first direction. The method also includes (d) rotating the second D-fiber; (e) obtaining a second image profile of an end of the second D-fiber and using the second image profile to measure a diameter of a cladding of the second D-fiber along the first direction; and (f) repeating (d) and (e) until a minimum diameter of the cladding of the second D-fiber is aligned along the first direction.

The method may also include (g) moving the first D-fiber along a second direction perpendicular to an optical axis of the first D-fiber; (h) measuring a first optical power of light transmitted through the first D-fiber and the second D-fiber; and (i) repeating (g) and (h) until the measured first optical power reaches a maximum value.

The method may also include (j) moving the second D-fiber along a third direction perpendicular to an optical axis of the second D-fiber and perpendicular to the second direction; (k) measuring a second optical power of light transmitted through the first D-fiber and the second D-fiber; and (l) repeating (j) and (k) until the measured second optical power reaches a maximum value.

The end of the first D-fiber may be separated from the end of the second D-fiber by a distance of approximately 6 μm.

The method may also include measuring an offset of a focal point of the first D-fiber from a center of the cladding of the first D-fiber along the first direction during (a) and (b), and fixing the first D-fiber at an orientation in which the minimum diameter of the cladding of the first D-fiber coincides with a minimum offset of the focal point of the first D-fiber.

The method may also include measuring an offset of a focal point of the second D-fiber from a center of the cladding of the second D-fiber along the first direction during (d) and (e), and fixing the second D-fiber at an orientation in which the minimum diameter of the cladding of the second D-fiber coincides with a minimum offset of the focal point of the second D-fiber.

Operation (b) of the method may also include moving the first D-fiber in a direction perpendicular to an optical axis of the first D-fiber if the first image profile does not include the entire diameter of the end of the first D-fiber.

Operation (e) of the method may also include moving the second D-fiber in a direction perpendicular to an optical axis of the second D-fiber if the second image profile does not include the entire diameter of the end of the second D-fiber.

According to another aspect of the present invention, there is provided a method of aligning a non-circular fiber with another component, the method including (a) rotating the non-circular fiber; (b) obtaining an image profile of an end of the non-circular fiber and using the image profile to measure a diameter of a cladding of the non-circular fiber along a first direction; and (c) repeating (a) and (b) until a minimum diameter of the cladding of the non-circular fiber is aligned along the first direction such that a polarization direction of the non-circular fiber is substantially aligned with a polarization direction of the other component.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
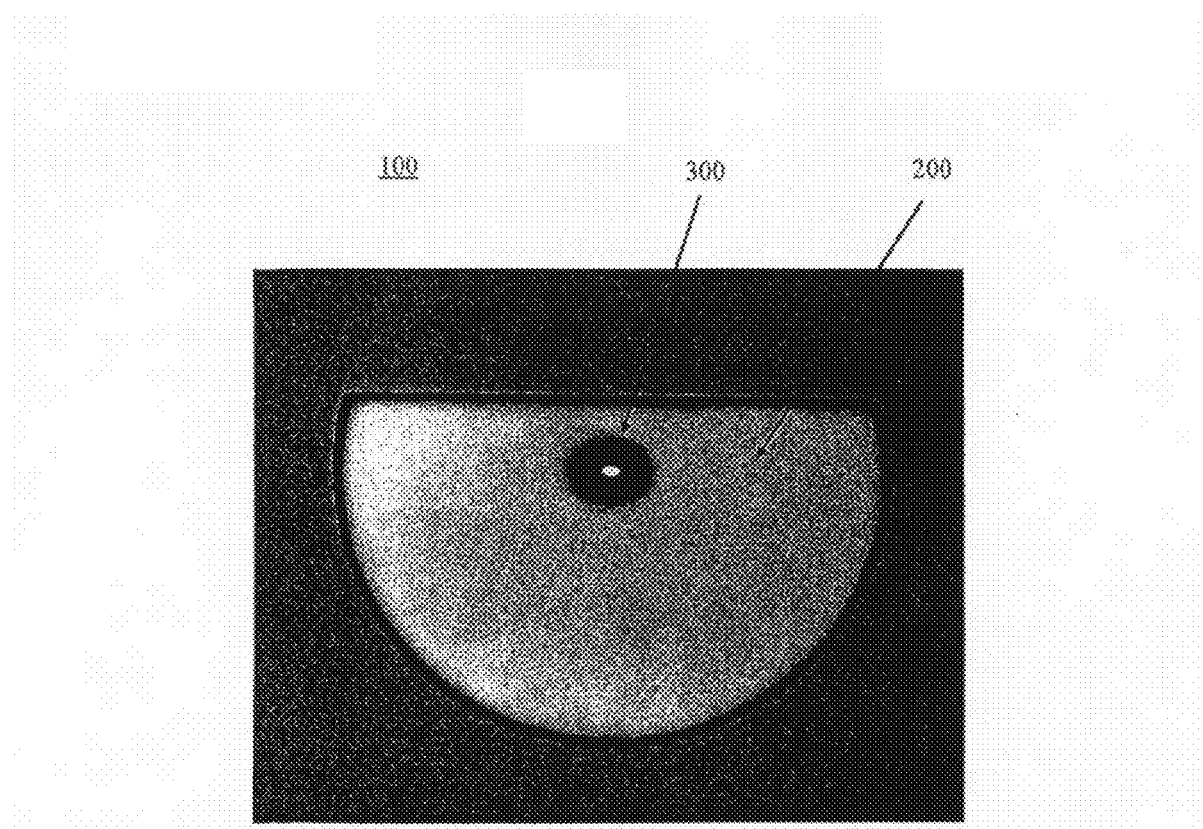
FIG. 1 is an image of a cross-section of a D-fiber with an elliptical core.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. However, the invention may be embodied in many different forms, and should not be construed as being limited to the exemplary embodiments set forth herein. In the drawings, like reference numerals denote like elements, and the thicknesses of layers and regions may be exaggerated for clarity and convenience.

Figure 2A:
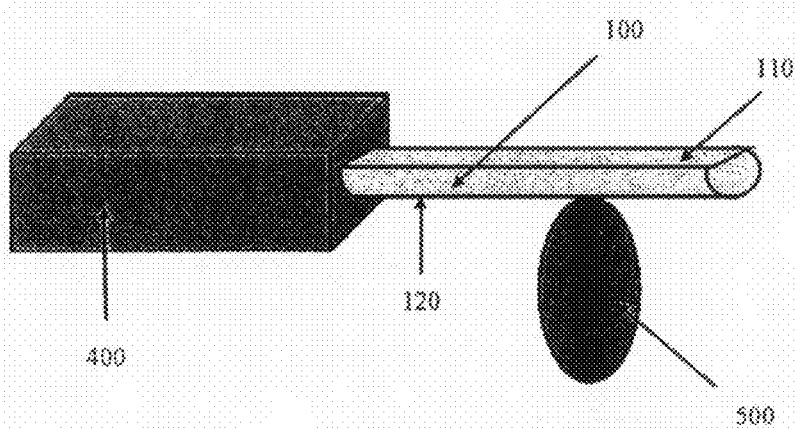
FIG. 2A shows the alignment of a D-fiber before cleaving, such that the flat surface of the D-fiber faces upwards.
Figure 2B:
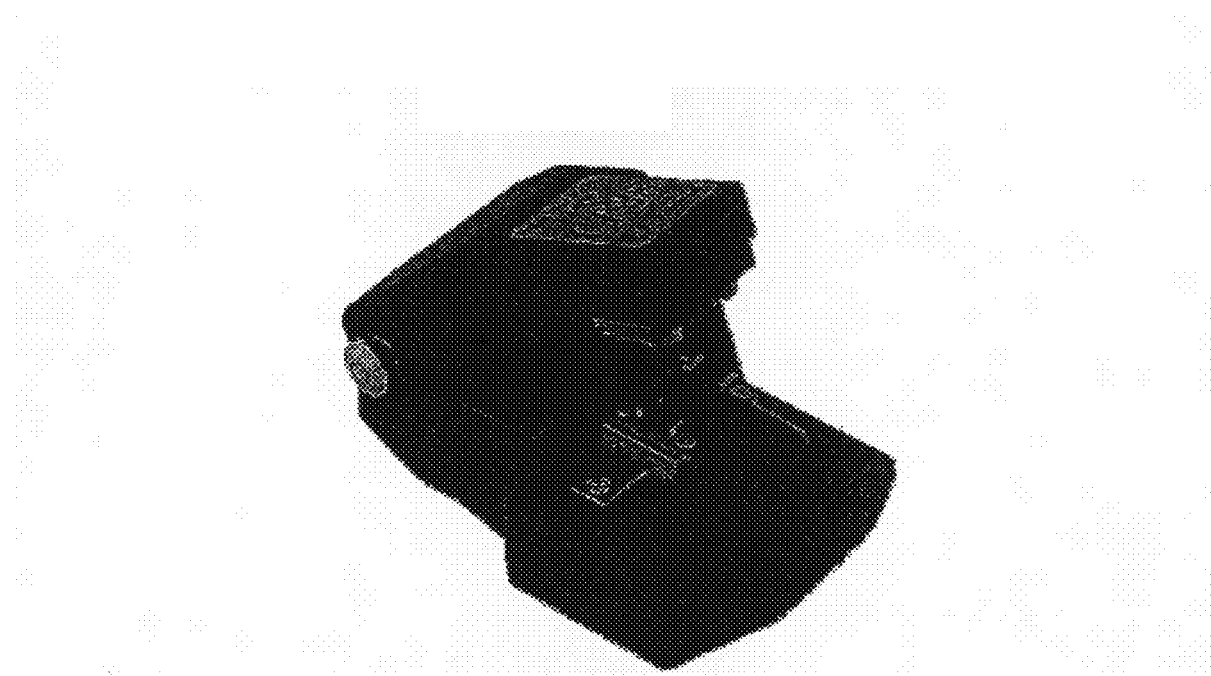
FIG. 2B shows an example of a fiber cleaver used to cleave 85-μm diameter D-fiber.

According to an exemplary embodiment of the present invention, a method for aligning a D-fiber using automatic polarization alignment is provided. As shown in FIG. 2A, a D-fiber (100) is aligned in a cleaver so that the flat surface (110) of the D-fiber (100) faces upward by observing the maximum brightness reflecting from the flat surface (110). This ensures that the cleaving blade contacts the circular portion (120) of the stripped fiber, resulting in optimal cleave quality. This technique produces adequate facet smoothness and a cleave angle of less than 2 degrees. Within the cleaver the D-fiber (100) is held by a clamp (400) and supported by a support (500). The D-fiber (100) may be mounted in a specially designed cleaver for 85-μm diameter fiber, such as the Fujikura CT-38 cleaver shown in FIG. 2B, and cleaved as described above. An 85-μm diameter fiber has a cladding with a maximum diameter of 85 μm. However, the present invention is not limited to 85-μm diameter fiber, and may be used with optical fibers having any diameter.

Figure 3A:
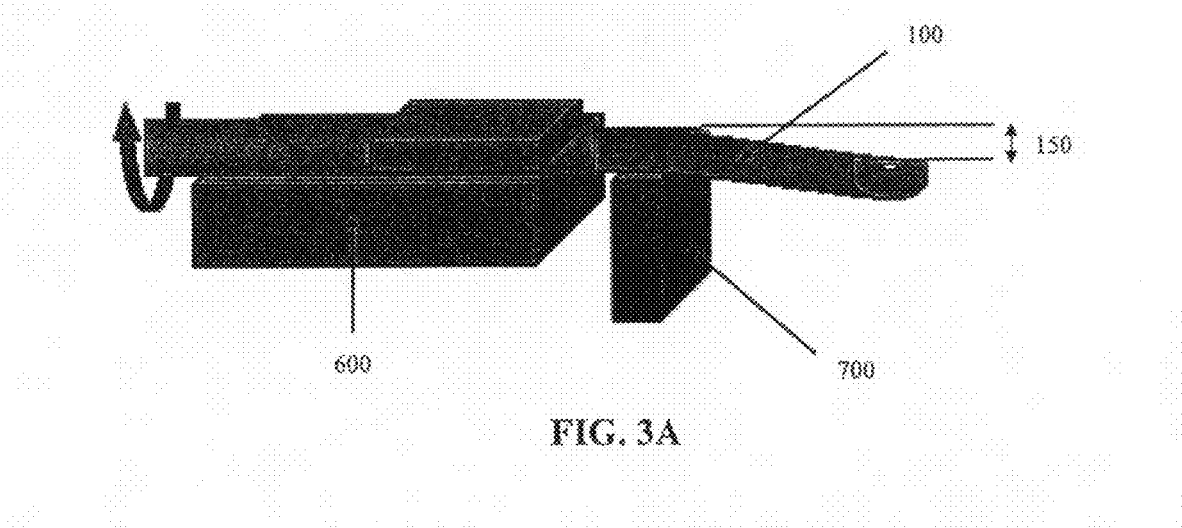
FIG. 3A shows a D-fiber that is held and rotated in a fiber holder according to an exemplary embodiment of the present invention.

In order to conduct automatic polarization alignment, two cleaved D-fibers may be placed in a splicer, such as the Fujikura 45PM splicer. As shown in FIG. 3A, one of the D-fibers (100) is rotated while being supported by the fiber holder (600) and the V-groove (700). As the D-fiber (100) rotates, an image sensor automatically acquires image profiles of the end of the D-fiber (100) at incremental angles of rotation. The D-fiber (100) may be rotated through 360°, or by a smaller amount, such as from 0° to 200°. A microprocessor uses the image profiles to measure the diameter of the cladding (200) of the D-fiber (100) along a specific direction, such as the direction (800) shown in FIG. 3B, for each incremental angle of rotation. The specific direction (800) is perpendicular to the optical axis of the D-fiber (100). According to an exemplary embodiment of the present invention, the D-fiber (100) rotates and image profiles are acquired until the diameter of the cladding (200) of the D-fiber (100) along the specific direction (800) reaches a minimum value. Once the minimum value is reached, the D-fiber (100) is fixed in place, and the above process is repeated for the other D-fiber (not shown). As a result of the method described above, the D-fibers are oriented such that their minimum cladding diameters are aligned along the same direction.

Figure 3B:
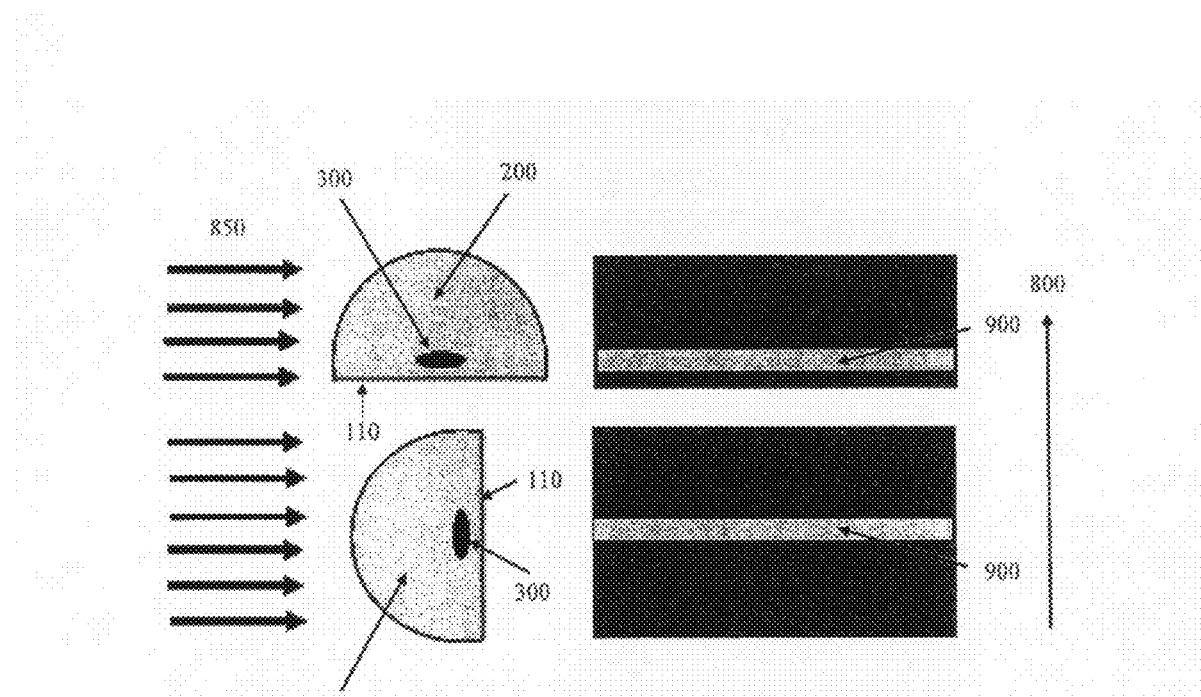
FIG. 3B shows the offset of the focal point of the fiber from the center of the cladding for two D-fibers in perpendicular orientations.
Figure 3C:
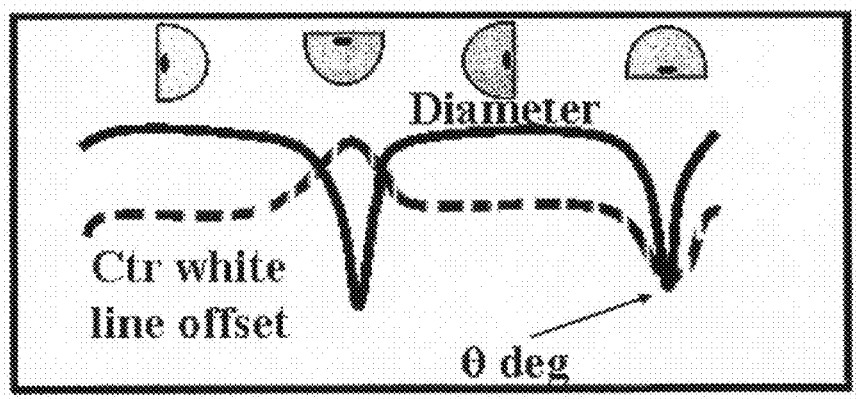
FIG. 3C shows the relationship between the orientation, the minimum diameter of the cladding, and the offset of the focal point from the center of the cladding for a D-fiber.

As the D-fiber (100) rotates, its minimum cladding diameter may be aligned along the specific direction (800) twice. For example, FIG. 3C shows that the cladding diameter reaches a minimum along the vertical specific direction (800) at two angles of rotation, one when the flat surface (110) of the D-fiber (100) faces upwards, and the other when the flat surface (110) of the D-fiber (100) faces downwards. In order to ensure that the D-fibers are aligned at the same orientation, the offset of a focal point (900) from a center of the cladding (200) of each D-fiber (100) may be measured for each incremental angle of rotation. As shown in FIG. 3B, light (850) is incident on the D-fiber (100) from the side of the D-fiber (100), and the focal point (900) appears as a white line in the image on the right-hand side of FIG. 3B. FIG. 3B shows that the offset of the focal point (900) from the center of the cladding (200) reaches a minimum when the flat surface of the D-fiber faces downwards, and is zero when the flat surface (110) of the D-fiber (100) faces to the right. As shown in FIG. 3C, the orientation of the D-fiber (100) may be chosen by fixing the D-fiber (100) at the rotational angle (θdeg) where both the cladding diameter and the offset are at a minimum value. This process may then be repeated for the other D-fiber, thus ensuring that the claddings of both D-fibers are aligned along the same direction, and that the polarization directions of both D-fibers are aligned along the same direction.

Due to its asymmetric shape, the D-fiber (100) may become slightly bowed as it rotates during the measurement, which may cause part of the end of the D-fiber (100) to leave the field of view of the image sensor. As shown in FIG. 3A, the D-fiber (100) may bend downwards so that its end is displaced by a distance (150). Therefore, the microprocessor may analyze each image profile to determine whether the entire cladding diameter of the end of the D-fiber (100) is captured within the image profile. If the entire cladding diameter is not included, the microprocessor will send a control signal to adjust the height or the lateral position of the D-fiber (100) so that the entire cladding diameter is included in the image profile. These adjustments can be achieved by releasing the clamps of the fiber holder (600) and adjusting the height of the V-groove (700).

Once the polarizations of the D-fibers have been aligned by the process described above, the cores of the D-fibers may be aligned by an automatic power meter feedback method. This method accounts for the high eccentricity and inconsistencies of the D-fibers. During the core alignment, an optical source provides light to one end of the first D-fiber. The optical power of light transmitted through the first D-fiber and the second D-fiber is measured, and the position of the first D-fiber is adjusted until the optical power is maximized. For example, the first D-fiber may be moved laterally until the optical power is maximized. The position of the second D-fiber may then be adjusted until the optical power is maximized again. For example, the second D-fiber may be moved vertically until the optical power is maximized. This process may be repeated several times to provide an optimal core alignment of the D-fibers.

Figure 4:
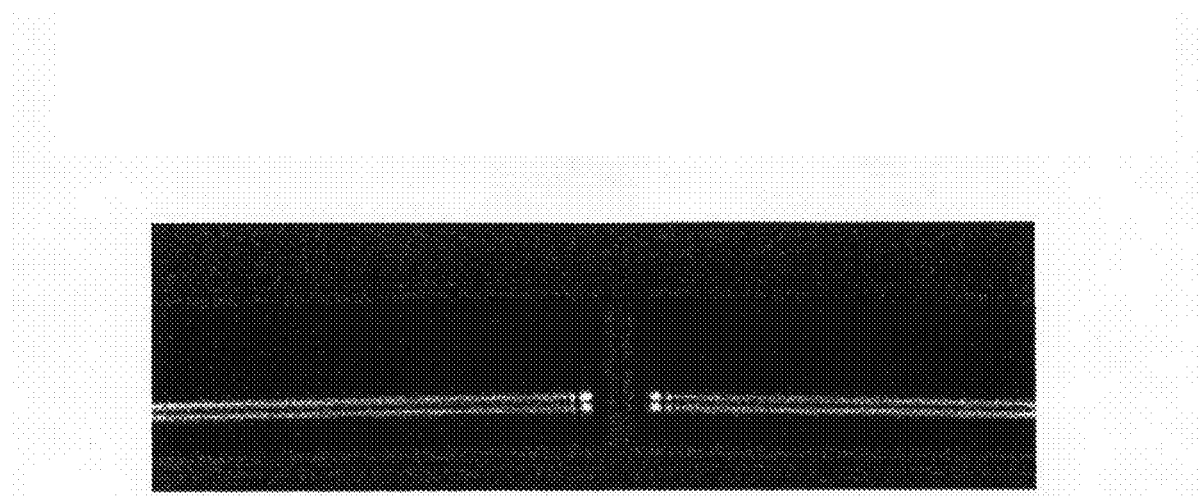
FIG. 4 is an image profile of two D-fibers before splicing.
Figure 5:
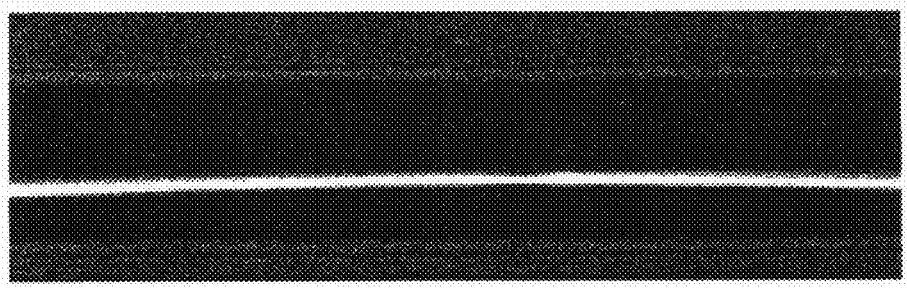
FIG. 5 is an image profile of the two D-fibers shown in FIG. 4 after splicing.

Once the polarizations and the cores of the D-fibers have been aligned as described above, the D-fibers are spliced together. D-fiber is very sensitive to arc power and duration. In order to preserve the D-shape while preventing excessive rounding and core deformation at the splice region, a short cleaning arc of approximately 80 msec may be used, the pre-fusion setting may be turned off, and a short splicing arc of approximately 250 msec may be applied. FIG. 4 shows two D-fibers before splicing, and FIG. 5 shows the two D-fibers after splicing. As shown in FIG. 4, the D-fibers jump slightly upwards at the start of arc ignition. This is likely a result of the asymmetric shape of the D-fiber cladding. To reduce this effect, a small gap of approximately 6 μm may be maintained during alignment and splicing to reduce the heating time before the fibers touch during splicing.

Figure 6:
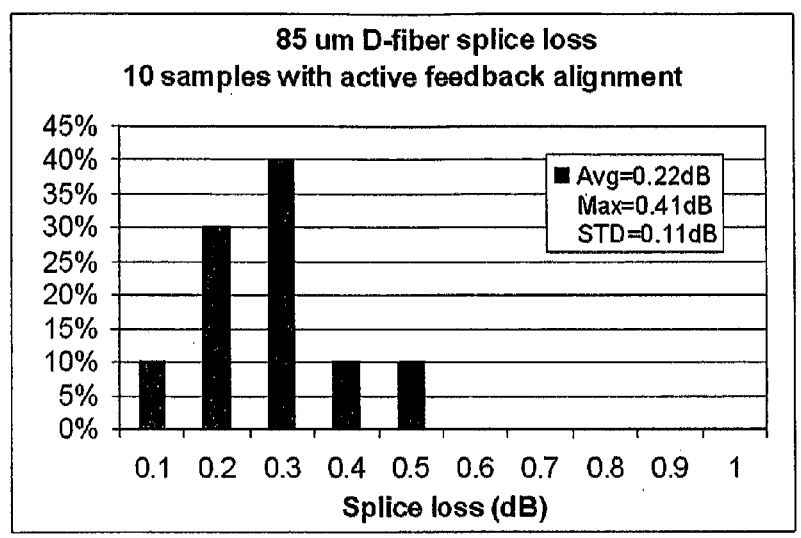
FIG. 6 is a graph showing the splice loss distribution when two 85-μm diameter D-fibers are aligned and spliced according to an exemplary embodiment of the present invention.

Several measurements were conducted to measure the quality of the splice achieved by the alignment method described above. In order to measure the splice loss, an optical source provided light to one end of the first D-fiber, and the optical power of light transmitted through the first D-fiber and the second D-fiber was measured. In these measurements the splice loss was measured with an 850 nm laser emitting diode (LED) light source used in conjunction with an Agilent 8163A power meter. As shown in FIG. 6, the average splice loss for two 85-μm diameter D-fibers was 0.22 dB, which is below a typical maximum limit of 0.5 dB. The standard deviation was 0.11 dB, which is likely a result of a number of factors such as fiber curl, fiber movement, and cleave quality.

Figure 7:
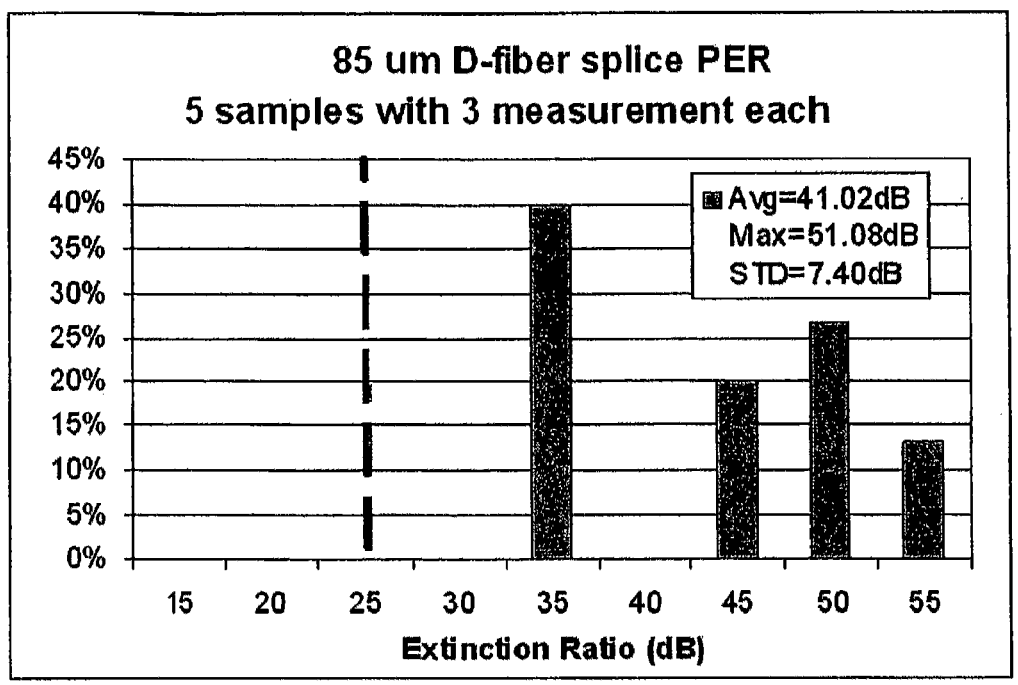
FIG. 7 is a graph showing the polarization extinction ratio distribution when two 85-μm diameter D-fibers are aligned and spliced according to an exemplary embodiment of the present invention.

The polarization extinction ratio (PER) was measured with an Adaptif A1200 measurement system, in which a length of D-fiber was heated in a thermal cycling unit before and after the splice region. The PER was determined by creating circle trajectories on the Poincare sphere. The measurement was performed after releasing the D-fiber from the fiber holder. The stress induced by the fiber holder lid typically introduces a 1-2 degree polarization angle offset. As shown in FIG. 7, the average PER for two 85-μm diameter D-fibers was 41.02 dB, which is greater than 25 dB. A typical minimum limit for the PER is between 20 and 30 dB. The splice loss of less than 0.5 dB and the PER greater than 25 dB were consistently achieved for the automated alignment and splicing method described above, in which the average duration of alignment and splicing was approximately two minutes.

Although the above exemplary embodiment describes the alignment and splicing of two D-fibers, the method of the present invention can also be used to align and splice any non-circular fiber, such as a D-fiber, with any other polarization maintaining component, such as a circular fiber with an elliptical core. In this case the D-fiber is rotated until its minimum diameter is aligned such that the polarization direction of the D-fiber is substantially aligned with the polarization direction of the circular fiber.

While the present invention has been particularly shown and described with reference to exemplary embodiments thereof, it will be understood by those of ordinary skill in the art that various changes in form and detail may be made therein without departing from the spirit and scope of the present invention as defined by the following claims and their legal equivalents.

What is claimed is:

1. A method of aligning a first D-fiber with a second D-fiber, the method comprising:
   (a) rotating the first D-fiber;
   (b) obtaining a first image profile of an end of the first D-fiber and using the first image profile to measure a diameter of a cladding of the first D-fiber along a first direction;
   (c) repeating (a) and (b) until a minimum diameter of the cladding of the first D-fiber is aligned along the first direction;
   (d) rotating the second D-fiber;
   (e) obtaining a second image profile of an end of the second D-fiber and using the second image profile to measure a diameter of a cladding of the second D-fiber along the first direction; and
   (f) repeating (d) and (e) until a minimum diameter of the cladding of the second D-fiber is aligned along the first direction.

2. The method according to claim 1, further comprising:
   (g) moving the first D-fiber along a second direction perpendicular to an optical axis of the first D-fiber;
   (h) measuring a first optical power of light transmitted through the first D-fiber and the second D-fiber; and
   (i) repeating (g) and (h) until the measured first optical power reaches a maximum value.

3. The method according to claim 2, further comprising:
   (j) moving the second D-fiber along a third direction perpendicular to an optical axis of the second D-fiber and perpendicular to the second direction;
   (k) measuring a second optical power of light transmitted through the first D-fiber and the second D-fiber; and
   (l) repeating (j) and (k) until the measured second optical power reaches a maximum value.

4. The method according to claim 1, wherein the end of the first D-fiber is separated from the end of the second D-fiber by a distance of approximately 6 μm.

5. The method according to claim 1, further comprising measuring an offset of a focal point of the first D-fiber from a center of the cladding of the first D-fiber along the first direction during (a) and (b), and fixing the first D-fiber at an orientation in which the minimum diameter of the cladding of the first D-fiber coincides with a minimum offset of the focal point of the first D-fiber.

6. The method according to claim 5, further comprising measuring an offset of a focal point of the second D-fiber from a center of the cladding of the second D-fiber along the first direction during (d) and (e), and fixing the second D-fiber at an orientation in which the minimum diameter of the cladding of the second D-fiber coincides with a minimum offset of the focal point of the second D-fiber.

7. The method according to claim 1, wherein (b) further comprises moving the first D-fiber in a direction perpendicular to an optical axis of the first D-fiber if the first image profile does not include the entire diameter of the end of the first D-fiber.

8. The method according to claim 7, wherein (e) further comprises moving the second D-fiber in a direction perpendicular to an optical axis of the second D-fiber if the second image profile does not include the entire diameter of the end of the second D-fiber.

9. A method of aligning a non-circular fiber with another component, the method comprising:
   (a) rotating the non-circular fiber;
   (b) obtaining an image profile of an end of the non-circular fiber and using the image profile to measure a diameter of a cladding of the non-circular fiber along a first direction; and
   (c) repeating (a) and (b) until a minimum diameter of the cladding of the non-circular fiber is aligned along the first direction such that a polarization direction of the non-circular fiber is substantially aligned with a polarization direction of the other component.

10. The method according to claim 9, further comprising:
    (d) moving the non-circular fiber along a second direction perpendicular to an optical axis of the non-circular fiber;
    (e) measuring a first optical power of light transmitted through the non-circular fiber and the other component; and
    (f) repeating (d) and (e) until the measured first optical power reaches a maximum value.

11. The method according to claim 10, further comprising:
    (g) moving the other component along a third direction perpendicular to an optical axis of the other component and perpendicular to the second direction;
    (h) measuring a second optical power of light transmitted through the non-circular fiber and the other component; and
    (i) repeating (g) and (h) until the measured second optical power reaches a maximum value.

12. The method according to claim 9, further comprising measuring an offset of a focal point of the non-circular fiber from a center of the cladding of the non-circular fiber along the first direction during (a) and (b), and fixing the non-circular fiber at an orientation in which the minimum diameter of the cladding of the non-circular fiber coincides with a minimum offset of the focal point of the non-circular fiber.

13. The method according to claim 9, wherein (b) further comprises moving the non-circular fiber in a direction perpendicular to an optical axis of the non-circular fiber if the first image profile does not include the entire diameter of the end of the non-circular fiber.

* * * * *